(12) United States Patent
Ng

(10) Patent No.: US 9,592,792 B2
(45) Date of Patent: Mar. 14, 2017

(54) SWIVEL BAR PEDAL LOCK

(71) Applicant: Chee Wah Ng, Kuala Lumpur (MY)

(72) Inventor: Chee Wah Ng, Kuala Lumpur (MY)

( * ) Notice: Subject to any disclaimer, the term of this patent is extended or adjusted under 35 U.S.C. 154(b) by 14 days.

(21) Appl. No.: 14/647,432

(22) PCT Filed: Jan. 10, 2013

(86) PCT No.: PCT/MY2013/000001
§ 371 (c)(1),
(2) Date: May 26, 2015

(87) PCT Pub. No.: WO2014/109628
PCT Pub. Date: Jul. 17, 2014

(65) Prior Publication Data
US 2015/0298652 A1    Oct. 22, 2015

(30) Foreign Application Priority Data

Jan. 9, 2013 (MY) .............................. PI2013700041

(51) Int. Cl.
*B60R 25/00* (2013.01)

(52) U.S. Cl.
CPC .......... *B60R 25/006* (2013.01); *B60R 25/005* (2013.01)

(58) Field of Classification Search
CPC . B60R 25/005; B60R 25/0221; B60R 25/006; B60R 25/002; B60R 25/003; B60R 25/00; Y10T 70/5735; Y10T 70/5889; Y10T 70/573; Y10T 70/5721; Y10T 74/20888
USPC ................... 70/201–203, 237, 238
See application file for complete search history.

(56) References Cited

U.S. PATENT DOCUMENTS

| | | | | |
|---|---|---|---|---|
| 1,333,093 A | * | 3/1920 | Pierce ................... | B60R 25/005 188/265 |
| 1,335,532 A | * | 3/1920 | Sleeper ................. | B60R 25/005 70/203 |
| 1,348,891 A | * | 8/1920 | Nixon ................... | B60R 25/005 70/202 |
| 1,366,992 A | * | 2/1921 | Winchell .............. | B60R 25/005 70/202 |
| 1,376,221 A | * | 4/1921 | Nordin .................. | B60R 25/005 70/16 |

(Continued)

FOREIGN PATENT DOCUMENTS

| | | |
|---|---|---|
| CA | 2228229 A1 | 10/1999 |
| FR | 2613992 A2 | 10/1988 |

(Continued)

*Primary Examiner* — Suzanne Barrett
(74) *Attorney, Agent, or Firm* — Knobbe, Martens, Olson & Bear, LLP

(57) ABSTRACT

A pedal lock includes an elongate frame. A first locking mechanism operating a swivel bar pivoted at distal end of the elongate frame is installed. The swivel bar is pivotable in quarter turns between a horizontal first position, in which the pedal is locked, and a second vertical unlocked position. A mounting member extends from the elongate frame to anchor onto a fixed part of a vehicle body to immovably affix the pedal lock relative to the vehicle. A first and second lock can be provided to secure the pedal lock in the locked position. A sliding mechanism enables a single step hand actuation to simultaneously lock both locks. To unlock, each of the two locks can be unlocked individually by key before the pedal lock can be released.

28 Claims, 8 Drawing Sheets

(56) References Cited

U.S. PATENT DOCUMENTS

| | | | | |
|---|---|---|---|---|
| 1,427,285 A * | 8/1922 | Goehner | B60R 25/005 | 70/203 |
| 1,439,111 A * | 12/1922 | Laney | B60R 25/005 | 70/19 |
| 1,442,203 A * | 1/1923 | Williams | B60R 25/005 | 70/202 |
| 1,444,379 A * | 2/1923 | Jones | B60R 25/006 | 70/160 |
| 1,480,149 A * | 1/1924 | Carpenter | B60R 25/005 | 70/203 |
| 1,489,574 A * | 4/1924 | Graham | B60R 25/005 | 70/202 |
| 1,519,534 A * | 12/1924 | Erickson | B60R 25/005 | 70/202 |
| 1,585,962 A * | 5/1926 | Bray | B60R 25/007 | 70/19 |
| 1,596,083 A * | 8/1926 | Cyganczuk | B60R 25/005 | 70/202 |
| 2,103,089 A * | 12/1937 | Pichucki | B60R 25/005 | 70/202 |
| 3,889,499 A * | 6/1975 | Cramer | B60R 25/005 | 70/202 |
| 4,432,432 A * | 2/1984 | Martin | B60R 25/005 | 180/287 |
| 4,876,865 A * | 10/1989 | Trinidad | B60R 25/005 | 70/203 |
| 5,001,913 A * | 3/1991 | Gamboni | B60R 25/005 | 70/202 |
| 5,094,092 A * | 3/1992 | Hsieh | B60R 25/005 | 70/199 |
| 5,359,868 A * | 11/1994 | Villani | B60R 25/006 | 70/164 |
| 5,613,382 A * | 3/1997 | Uter | B60R 25/005 | 70/199 |
| 5,673,576 A * | 10/1997 | Chen | B60R 25/008 | 70/199 |
| 5,964,109 A * | 10/1999 | Zenke | B60R 25/0225 | 70/19 |
| 6,058,749 A * | 5/2000 | Rekemeyer | B60R 25/0221 | 70/14 |
| 6,662,894 B2 * | 12/2003 | Chantrasuwan | B60R 25/005 | 180/287 |
| 6,792,780 B1 * | 9/2004 | De Lucia | B60R 25/005 | 70/202 |
| 7,793,526 B1 * | 9/2010 | Coggins | B60R 25/006 | 70/14 |
| 2004/0163432 A1 * | 8/2004 | Atthaprasith | B60R 25/006 | 70/202 |
| 2006/0272371 A1 * | 12/2006 | Lycoudis | B60R 25/005 | 70/202 |

FOREIGN PATENT DOCUMENTS

| | | | | |
|---|---|---|---|---|
| GB | 2063194 A * | 6/1981 | | B60R 25/005 |
| GB | 2274632 A | 8/1994 | | |
| MY | WO 2014109628 A1 * | 7/2014 | | B60R 25/005 |
| WO | WO 94/19216 A1 | 9/1994 | | |
| WO | WO 02/102630 A1 | 12/2002 | | |
| WO | WO 2011/087463 A2 | 7/2011 | | |

\* cited by examiner

SWIVEL BAR PEDAL LOCK

TECHNICAL FIELD

This invention generally relates to locks for securing vehicles from thefts. Specifically, it concerns a pedal lock for immobilizing the foot pedal of the vehicle such as the clutch or brake pedals. More particularly, it provides for a locking configuration which would prevent accidental locking or obstructing the vehicle's foot pedal upon frontal impact crushing into the cabin's foot pedal area.

BACKGROUND ART

The brake pedal is often touted as one of the strongest part of a car and it is not surprising to see a wide variety of pedal locks in the after-market and literature compare to other vehicle locks such as that for securing the steering wheel (often contrasted as the softest) and gear stick. Vehicle pedal locks available in the market may be categorized into one of two types, i.e. removable locks and installed locks. Removable locks are those that are used to lock the pedals to render the pedal inoperable. Upon unlocking, the pedal lock may be removed and put away in a safe distance from the pedals such as under the driver seat, drawer under the seat, front passenger foot area, etc. which is within the driver's easy reach. Examples of such removable locks are People's Republic of China patent no. CN-201943467-U (He) which secures the pedal against the steering column while the rest, PRC patent No. CN 101531176 (Lin), British Patent No. GB-2,393,165 (Wu), U.S. Pat. No. 6,298,696 (Vito), U.S. Pat. No. 6,575,001 (Simon), U.S. Pat. No. 6,575,002 (Hsu), U.S. Pat. No. 6,792,780 (De Lucia), U.S. Pat. No. 6,976,374 (Dougherty), and U.S. Pat. No. 7,412,859 (Lycoudis) is secured against the vehicle floor.

When the vehicle is braked hard, it is possible that such removable lock's momentum would cause it to be dislodged from its resting place and pushed forward into the foot pedal area, thus posing obstruction to the foot pedals' operation and impeding the brake, acceleration and clutch functions. Such dangers may be mitigated by having the pedal lock permanently installed in the vehicle by bolting or anchoring it to an immovable part of the vehicle such as the floor board or steering column. Examples of such floor-anchored pedal locks include PRC patent No. CN-200988477 (Li), while WO 2004108488 (Eladio) and U.S. Pat. No. 6,662,894 (claiming priority of TH 0103000295 Watchara Chantrasuwan as inventor/applicant, licensed to Suwat Petcharapirat) requires permanent clamping onto the steering column. The locking or immobilizing principle of the installed to pedal locks are basically the same as the removable locks, i.e. telescopically or outwardly retracting a member which bars, clamps or blocks the pedal or pedal arm from operation.

In this specification, the vehicle "floor" or "floor board" is used interchangeably to broadly cover the rigid floor portion of a vehicle and which may continuously extend to the "firewall" portion separating the cabin from the engine compartment. While the user or driver would outwardly pull a lever or handle at the upper end proximal to the driver to retract the pedal blocking member into locking position which blocks the pedal or pedal arm, this blocking member could also be pushed or jerked into locking position by a sudden impact or collision force. Such events may accidentally lock up the foot pedal, rendering it non-operational, which is dangerous especially if the brake pedal is accidentally locked whereby the driver would not be able to stop the vehicle after such an initial impact or collision.

Thus, anti-locking mechanism is introduced to prevent accidental locking, such as that disclosed in WO 2011/087463 (Kantajaraniti), wherein the pedal blocking member may be latched by a small part such as a spring-biased pin (11) from being moved into locking position until the user releases the latch and allowing the pedal blocking member to be pulled into locked position. The question remains whether such safety latch would fail in face of impact force as it is mechanically a small component in form of a pin, spring or notch standing in the way of the heavier pedal blocking member being pushed by a huge external force.

SUMMARY OF INVENTION

Our present invention endeavours to provide for a pedal lock which would avoid the aforesaid dangers of accidental locking as a result of actuation of the pedal blocking member by sudden frontal jerk force or crash impact into the cabin, particularly the foot pedal area. To avoid the above-mentioned disadvantages of the prior art, it is desirous to provide for a configuration of pedal lock, in particular, the pedal blocking member, so that its resting and unlocked orientation does not pose risk of accidental locking of the foot pedal in the event of shock or impact arising from collision.

In a general embodiment, our pedal lock for securing at least a foot pedal of a vehicle in an inoperable position, said pedal lock comprising an elongate frame wherein is installed a first locking mechanism operating a swivel bar pivoted at distal end of said elongate frame. The swivel bar pivotable between a first position and a second position; a mounting member extending from said elongate frame anchoring onto a fixed part of the vehicle body so as to immovably affix said pedal lock relative to said vehicle. In the first position, said pedal lock is in locked position whereby said swivel bar blocks movement of said foot pedal, rendering it inoperable; whereas in said second position, said pedal lock is in unlocked position whereby said swivel bar unblocks and allows movement of said foot pedal.

In one aspect, the first i.e. locked position, the swivel bar is pivoted to about a horizontal position across at least part of the foot pedal or foot pedal arm (hereinafter "pedal arm") thereby immobilizing said foot pedal. In the second i.e. unlocked position, the swivel bar is pivoted to a vertical position, clear from obstructing the pedal and pedal arm movement when said foot pedal is depressed and/or released.

In a second aspect of our pedal lock, an actuator is provided to enable the locking mechanism to rotate the swivel bar to the first position by hand actuation thereby locking said pedal lock; whereas a lock-and-key means is provided to enable said locking mechanism to rotate the swivel bar to the second position thereby unlocking said pedal lock. The actuator preferably comprises a button, the pressing of which enables the locking mechanism to operate the swivel bar to the first position. The button is preferably provided at proximal end of the elongate frame and pushable telescopically thereinto to operate the swivel bar to the first position. Throughout the unlocked position, the swivel bar is preferably biased to remain in the vertical position as the locking mechanism is latched and optionally biased to remain in the vertical position. The actuation of the locking mechanism to rotate the swivel bar to the locking position includes releasing said swivel bar from being latched to the vertical position.

In a third aspect of our pedal lock, the swivel bar is a lever rotatable about a central fulcrum at distal end of the elongate frame. One end of the swivel bar is preferably sufficiently long to block movement of the foot pedal and the other end providing at least in part weight counter-balance. Preferably, both ends of the swivel bar is sufficiently long to block movement of respective foot pedals on either side of the fulcrum. In the locked position, a tip portion of the swivel bar in horizontal position is adapted to block the opposing edge of either one of the brake or clutch pedal. Preferably, the elongate frame is substantially a tubular housing within which the locking mechanism may be securely installed. The actuator may preferably be provided as a slide block adjacent the tubular housing, the sliding action of said block is translated to rotate the swivel bar to locked position.

In a fourth aspect, a second locking mechanism is provided to secure the first locking mechanism in the latter's respective position. The second locking mechanism may preferably be provided to secure the first locking mechanism at the first (locked) position. Preferably, the second locking mechanism is provided with an actuator to enable said second locking mechanism to be locked by manual actuation, whereas lock-and-key means is provided to enable said second locking mechanism to unlock and to enable first locking mechanism to be subsequently unlocked. The first and second locking mechanism may be locked and/or unlocked by the same key. Preferably, the swivel bar remains biased to remain in vertical position when either one of the first or second locking mechanisms is still locked. When the swivel bar is in the unlocked, vertical position, the first locking mechanism may not be actuated to rotate said swivel bar to locked, horizontal position until the second locking mechanism is first actuated to its locking position.

The first lock is preferably latched to remain in unlocked position until manually unlatched by the user. The latching of the first lock in unlocked position also secures a second lock from operating in locking position. With the first lock unlatched, the second lock is rotatable to locking position in which a locking pin from each of said first lock and second lock engages against the other lock simultaneously in locking position. The rotation to locking position of at least one of the first lock and second lock is transmitted from a linear movement of a sliding mechanism. The rotation to locking position of at least one of the first lock and second lock is transmitted from a lever movement of a lever mechanism.

In a fifth aspect of our pedal lock, the mounting member comprises a reversibly extendable arm which distal end is provided with a base plate such that, upon the swivel bar is rotated to the first position, said extendable arm is extended to enable the base plate to engage the vehicle floor to render said pedal lock immovable, and wherein the first locking mechanism also securing said arm at the extended length. Preferably, the mounting member comprises a reversibly extendable arm which distal end is provided with a base plate such that, upon the swivel bar is rotated to the first position, said extendable arm is extended to enable the base plate to engage the vehicle floor to render said pedal lock immovable, and wherein at least one of the first and second locking mechanism also securing said arm at the extended length. The mounting member preferably extends from the elongate frame to end with a base affixable to the vehicle floor. The base is preferably a tripod base with bolt-and-nut means securing said pedal lock to the vehicle floor. Preferably, the mounting member extends from the elongate frame to a clamp means adapted to secure the pedal lock to the steering column.

LIST OF ACCOMPANYING DRAWINGS

The drawings accompanying this specification as listed below may provide a better understanding of our invention and its advantages when referred to in conjunction with the detailed description that follows as exemplary and non-limiting embodiments of our pedal lock.

Figure 3:
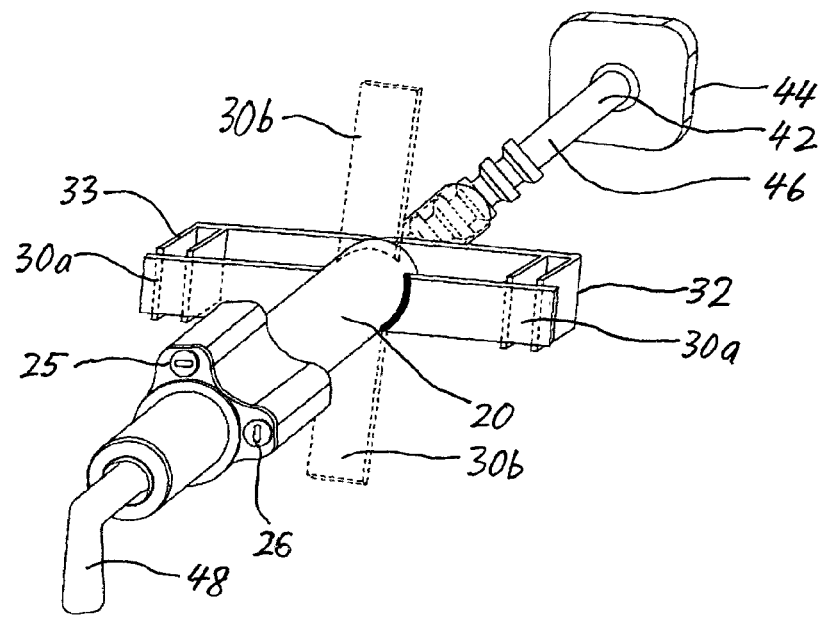

FIG. 3 embodies a third embodiment of the removable pedal lock with another locking mechanism of the swivel crossbar embodiment.

Figure 4:
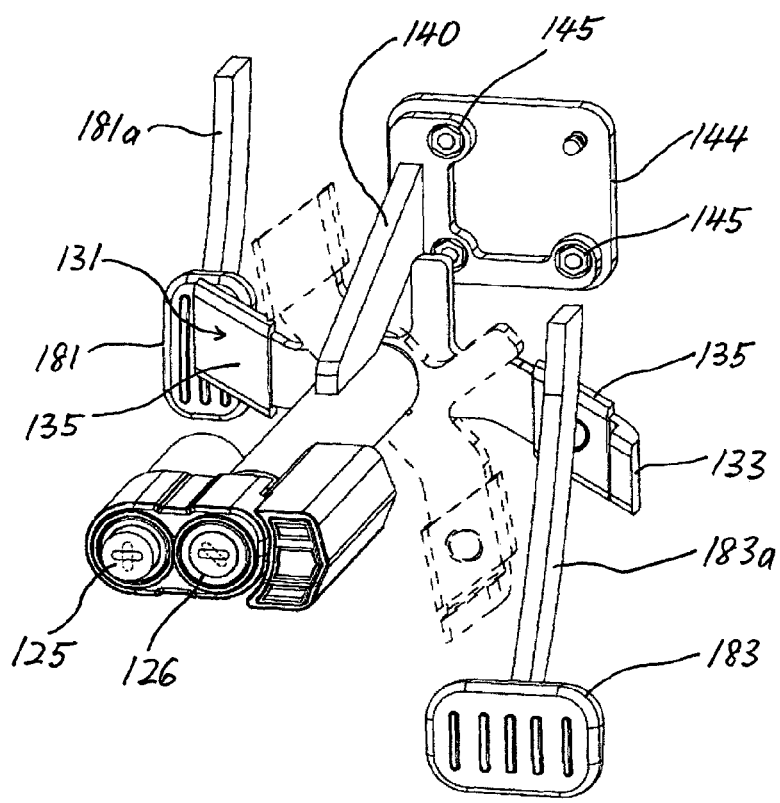

FIG. 4 exemplifies an embodiment of an affixed pedal lock comprising the preferred features of our invention, wherein the unlocked and locked positions of the swivel bar are shown.

Figure 5:
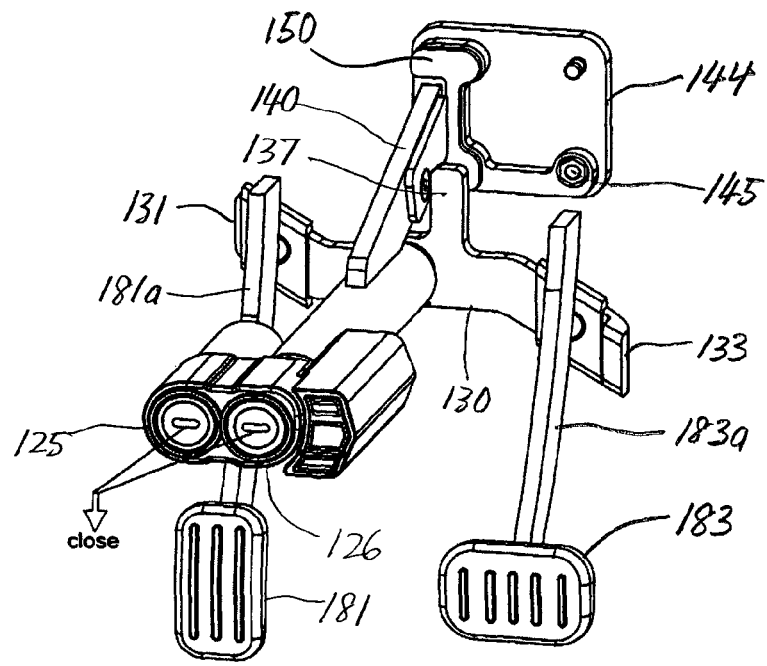

FIG. 5 indicates another embodiment of an affixed pedal lock in the locked position.

Figure 6:
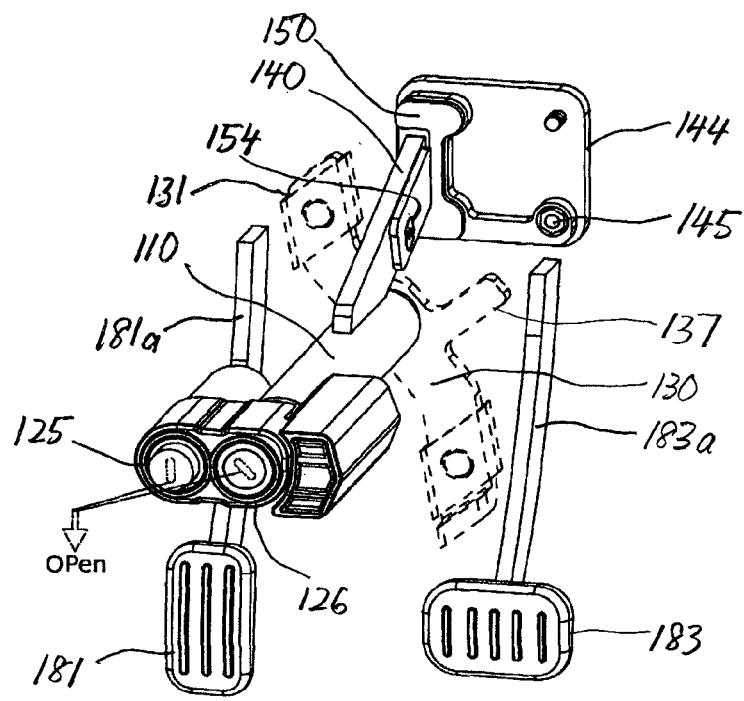

FIG. 6 illustrates the pedal lock of FIG. 5 in the unlocked position.

Figure 7:
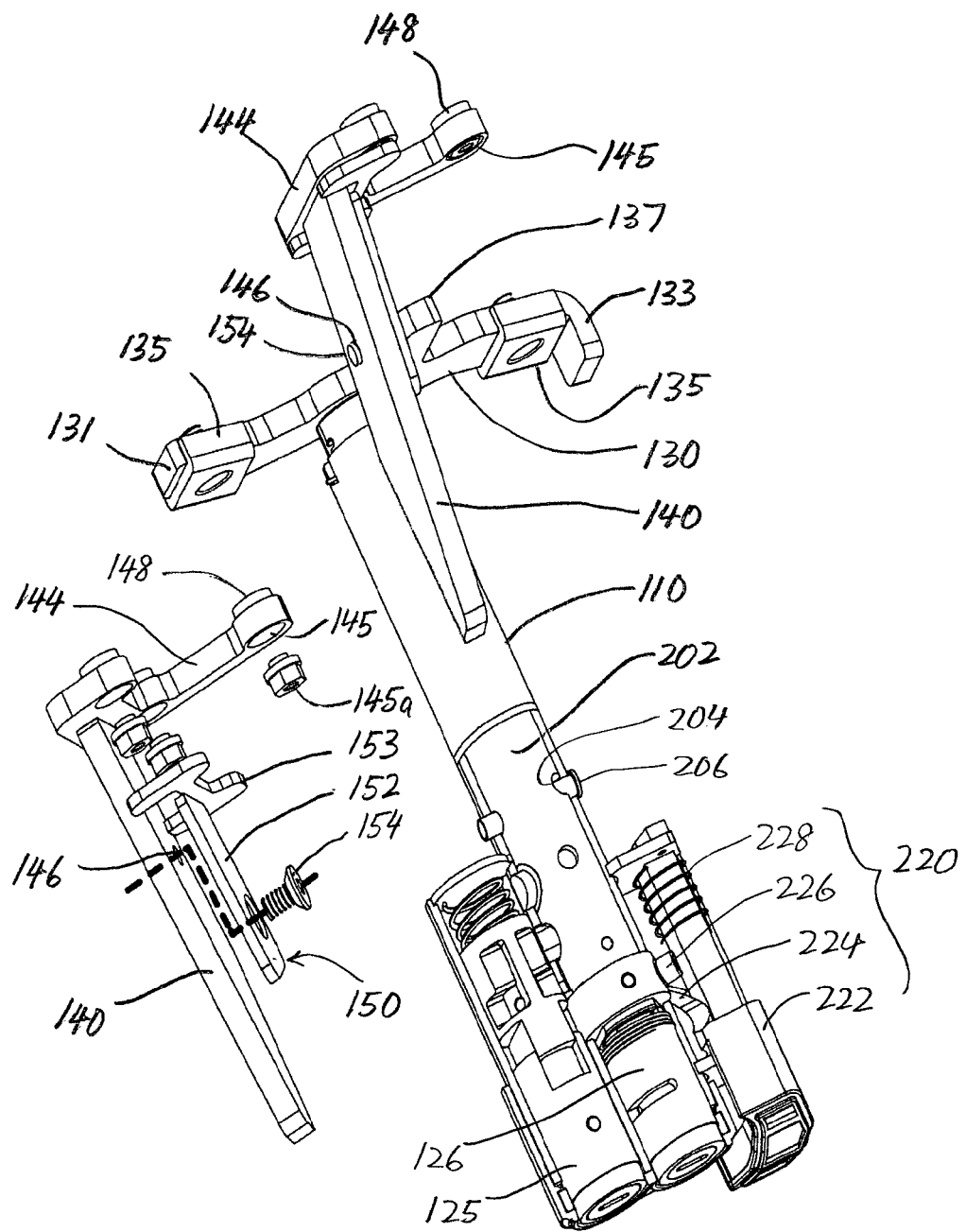

FIG. 7 presents in full length a perspective view of the details of the mounting member extension of the preferred embodiment of FIG. 4, including an anti-tamper feature for the anchoring base.

Figure 8:
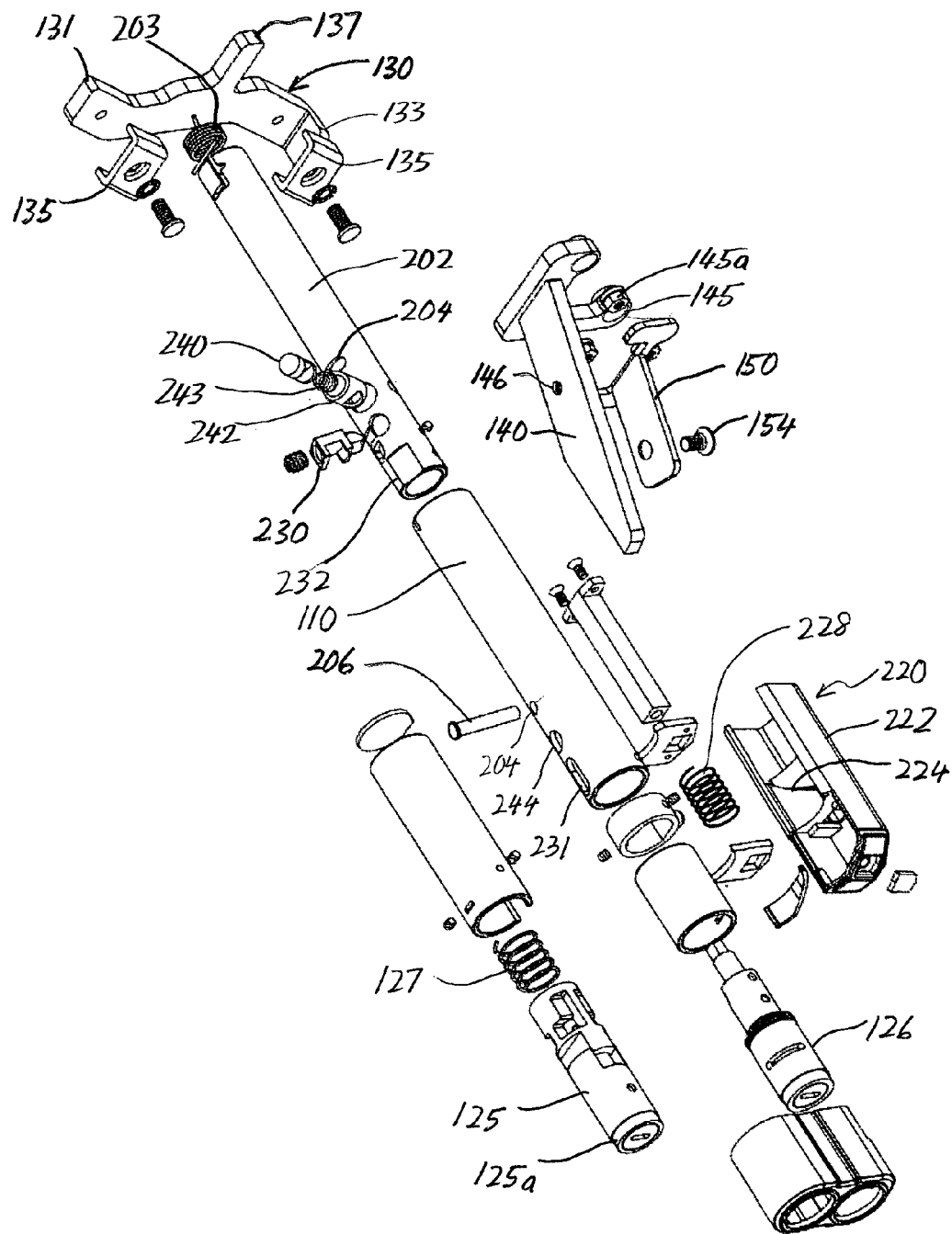

FIG. 8 displays the disassembled view of the preferred embodiment of FIG. 4.

Figure 9:
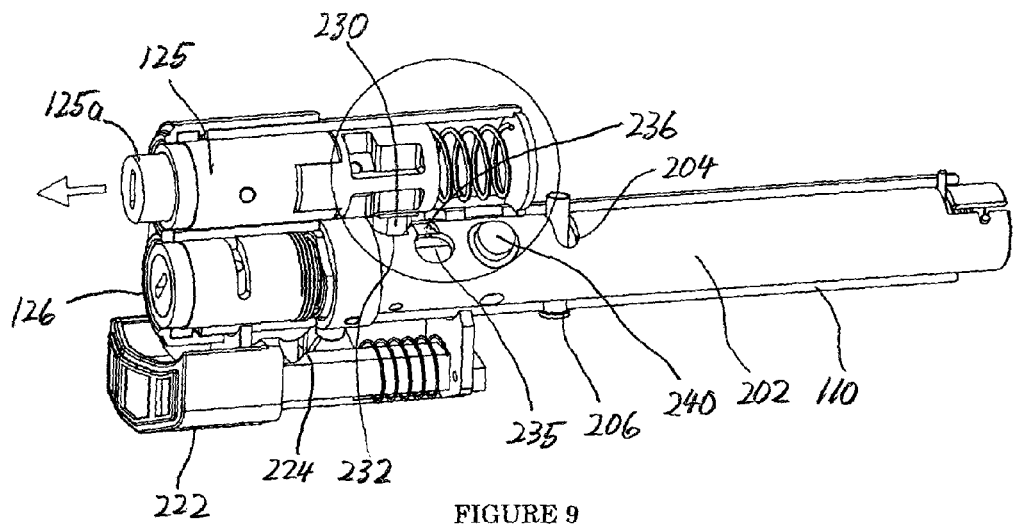

FIG. 9 shows the mechanism of a preferred embodiment of our pedal lock wherein the anti-lock safety feature is in a first position, which is unlocked with anti-locking feature engaged in position which prevents accidental locking.

Figure 10:
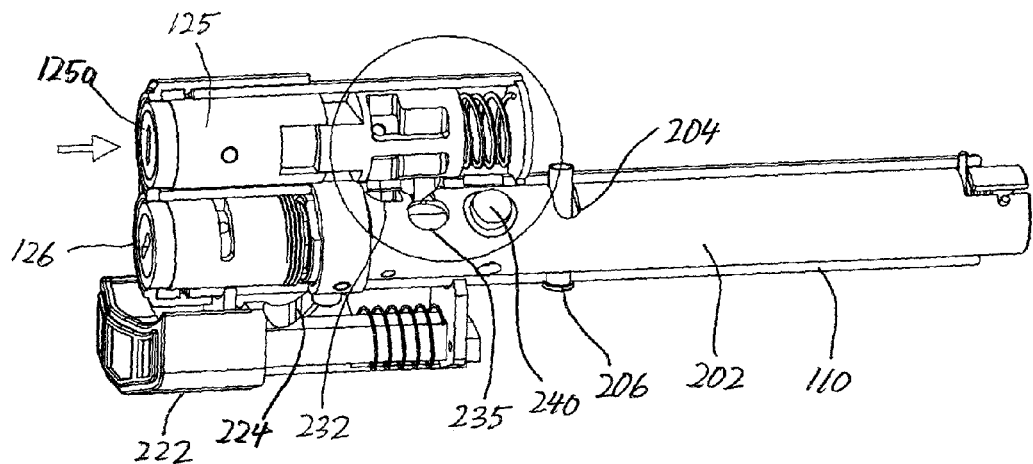

FIG. 10 illustrates the anti-lock mechanism of FIG. 9 in a second position, which is unlocked with anti-lock safety feature released or disengaged so that the locking mechanism is in a ready-to-lock position.

Figure 11:
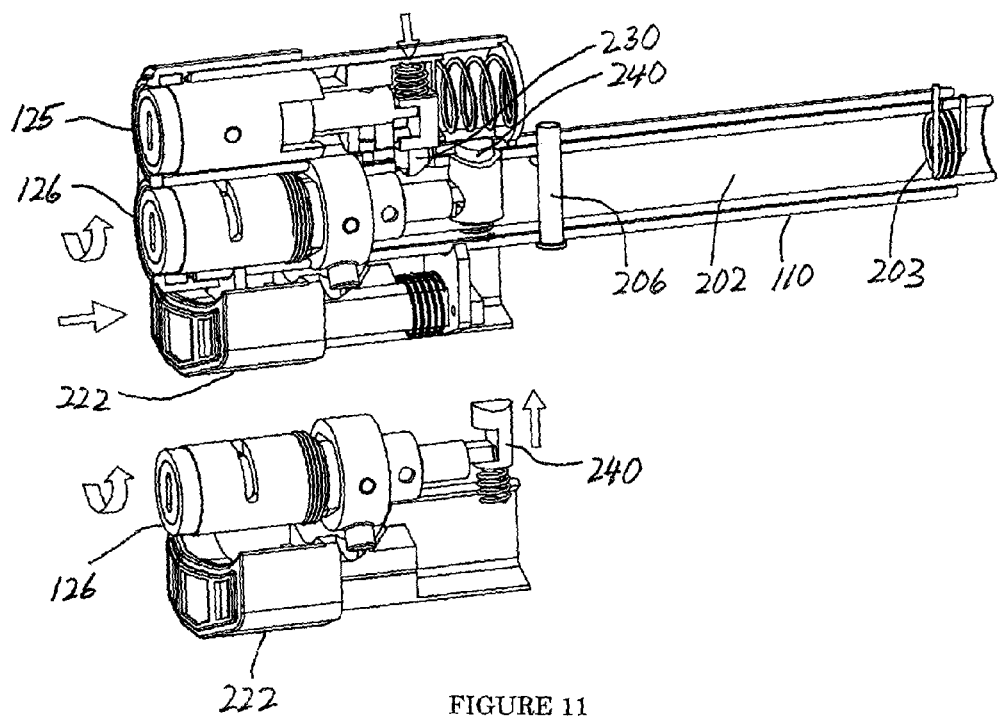

FIG. 11 embodies the mechanism of FIG. 10 being actuated by sliding action of a slide member, which is translated into rotation and latching which activate both first and second locking mechanisms into locked position.

Figure 12:
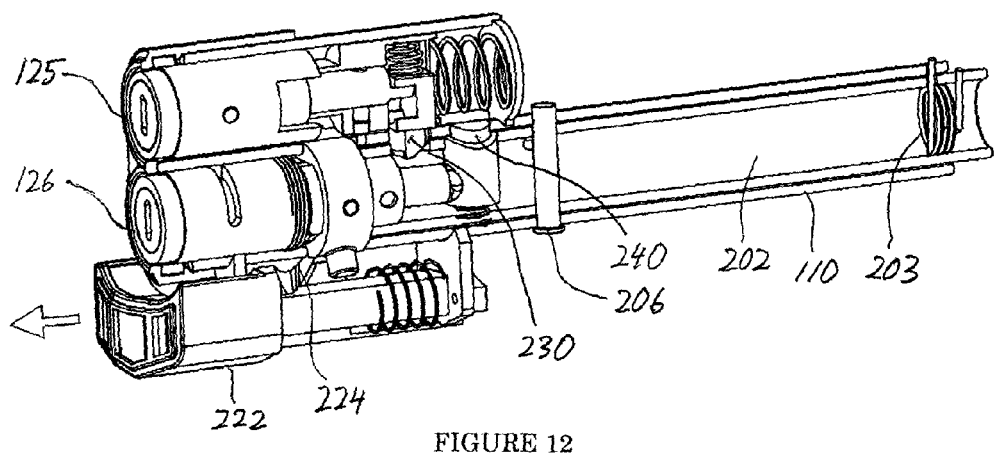

FIG. 12 exemplifies the mechanism of FIG. 11 where in the slide member is released back to its biased uncompressed position after locking.

Figure 13:
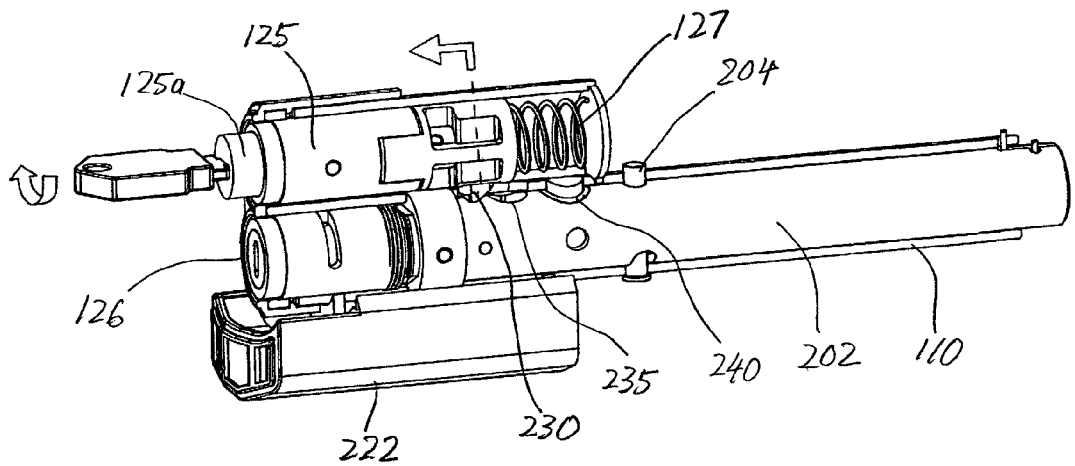

FIG. 13 indicates the unlocking sequence beginning with the first locking mechanism being unlocked and second locking mechanism remains locked.

Figure 14:
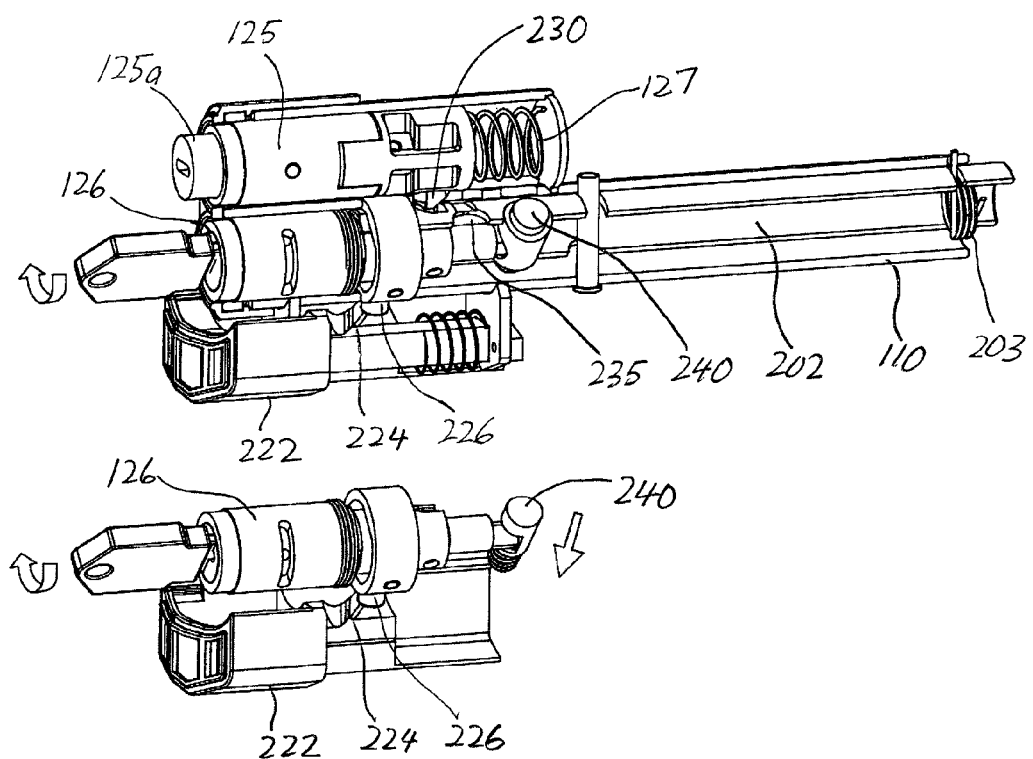

FIG. 14 illustrates the subsequent unlocking sequence with the second locking mechanism being unlocked thereby releasing the pedal lock's swivel bar from blocking the foot pedal.

DETAILED DESCRIPTION OF SPECIFIC EMBODIMENTS

Figure 1:
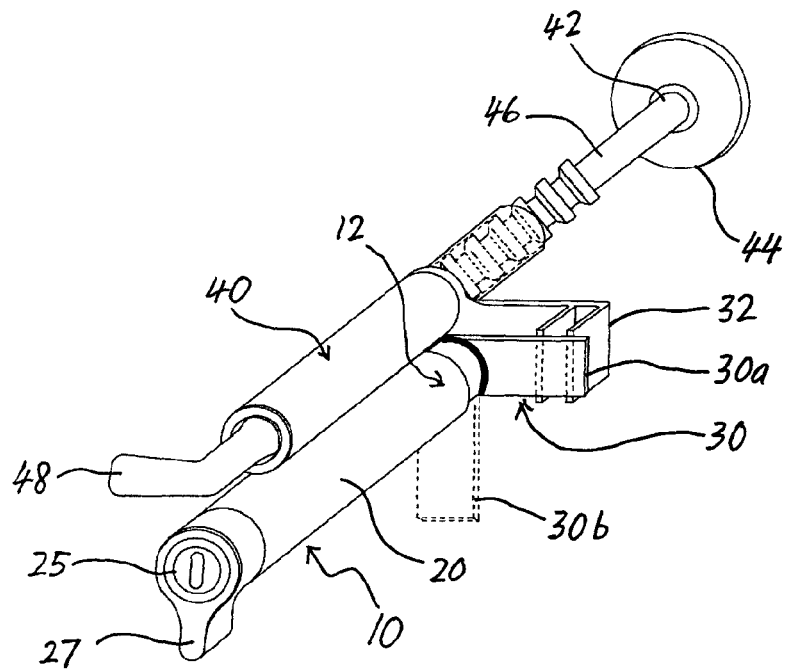
FIG. 1 shows a removable pedal lock employing a simple, one-sided swivel bar in accordance with the basic, general principle of our invention.

FIG. 1 shows a basic and general embodiment of our pedal lock for securing at least a foot pedal of a vehicle (not shown) in an inoperable position. This lock is configured as a removal pedal lock which, upon unlocking and disengaging from the pedals, may be removed therefrom and stowed away safely, e.g. under the front passenger's seat or foot rest area, within easy reach of the driver. One may refer to any one of FIGS. 4 to 6 for a better idea with regard to the relative positions of the foot pedals when engaged or locked by the pedal lock.

As shown in FIG. 1, the pedal lock basically comprises of an elongate frame 10 wherein is installed a first locking mechanism 20 which operates a swivel bar 30 pivoted at the distal end 12 of the elongate frame 10. A mounting member 40 is provided to extend from the elongate frame 10 in such manner to anchor the lock onto a fixed part of the vehicle body to immovably affix the pedal lock relative to the vehicle, to be explained later. The swivel bar 30 is pivotable between a first position 30a and a second position 30b. In the first position, the pedal lock is in a locked position, wherein the swivel bar 30 is rotatable to about a horizontal position 30a such that the foot pedal is blocked from movement thus rendering it inoperable. In the second position, the pedal lock is in unlocked position when the swivel bar 30 is rotatable to about a vertical position 30b, which does not block or obstruct the foot pedal's operation when it is depressed and/or released.

To better secure the pedal, a fork arm 32 is preferably provided such that its fork end is adapted to engage the pedal arm or stem (not shown) to secure it in the locked position 30a. The fork's 32 barbs may be spaced sufficiently to fit the pedal arm width in between. The pivotal rotation of the swivel bar 30 may be actuated by the operation of a lock 25, which may be a typical cylindrical lock whereby the locking or unlocking is by the turning of a key (not shown) and rotating the locking mechanism 20 in inner coaxial arrangement within the elongate frame 10. However, should the weight of the swivel bar 30 is too heavy and causes too much stress for the turning of the key and cylindrical lock, the pivotal rotation of the swivel bar 30 may be augmented by way of a knob or handle 27 at the proximal end of the elongate frame 10. The turning of the handle 27 by hand may transmit the rotation to pivotally rotate the swivel bar 30 to locking position 30a.

The locking mechanism 20 may be configured in a conventional manner whereby a latching mechanism (inside the elongate frame 10, not shown) will be engaged upon the swivel bar 30 being rotated to the horizontal lock position without the need for a key to lock it. For ease of locking, the turning of handle 27 may be configured to lock the locking mechanism 20 as well as the mounting member 40 such that the release of both the swivel bar 30 and the mounting member 40 require a key to unlock. For ease of unlocking, torsion biasing means (such as an internal spiral torsion spring, not shown) may preferably be provided to bias the rotation to vertical unlock position 30b in addition to relying on gravity.

To secure the pedal lock in an immovable position when in locking position, a mounting member 40, as shown in FIG. 1, may be provided as a member which length is adjustable to anchor onto a fixed part of the vehicle at the distal end. Any suitable fixed part of the vehicle may be used as the anchor point including any appropriate position along the steering column or a suitable position on the cabin floor board whereby the mounting member 40 may be adapted accordingly. To anchor onto the steering column, for example, the mounting member 40 may be provided with a pair of brackets (not shown) to securely grip the steering column. The brackets' grip on the steering shaft may be released by unlocking the lock 25, which would simultaneously release the swivel bar 30 from the horizontal or pedal locking position as well.

Figure 2:
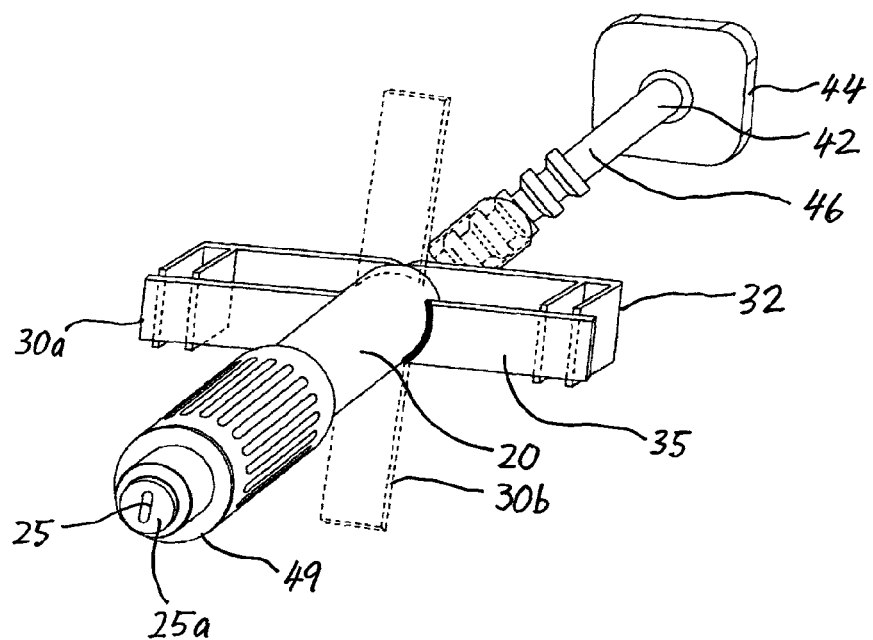
FIG. 2 illustrates a second embodiment of the removable pedal lock with a double-sided swivel bar or swivel crossbar.

To anchor onto the floor board, which is the anchoring embodiment shown in FIGS. 1 to 3, the mounting member 40 is preferably extendable, e.g. with a telescopically extending shaft 46 such that its distal end 42 may be anchored securely by pushing against the vehicle floor board (not shown). A lever 48 may be provided at the proximal end of the mounting member 40 for ease of user's grip and pushing or retracting the telescopic shaft 46. For better anchorage, the distal end 42 may be adapted into a broad base 44. Lock 25 may be configured to secure the mounting member 40 at the anchoring length while simultaneously locking the swivel bar 30 in horizontal position. Conversely, the unlocking by key means of lock 25 releases both the swivel bar 30 from the horizontal position as well as the mounting member 40 from its extended length. When not in use, the pedal lock may be removable and stowed away in the vehicle cabin when not in use.

FIG. 2 shows another embodiment of a removable pedal lock in which the telescopically extendable shaft 46 is configured in coaxial arrangement with the locking mechanism 20 such that the adjusting of the shaft 46 may be made manually by telescopically sliding a cylindrical gripping tube 49. The swivel arm in this embodiment may be adapted into a swivel crossbar 35 which in horizontal position complementarily engage each of forks 32, 33 on the respective ends of the horizontal fork arm. In this configuration, two foot pedals may be locked, e.g. the clutch pedal and brake pedal.

As the swivel crossbar 35 is now more or less balanced, a torsional biasing means such as a torsional spring may need to be provided to bias it at vertical unlock position 30b instead of relying on gravity. Another additional feature shown in FIG. 2 is that lock 25 may be configured with a press button 25a which linear movement from its pressing may be translated into rotation of the swivel crossbar 35 and latched into locking position so that a key is required to unlock it. Alternatively, the button 25a may be configured as a release mechanism to unlatch the swivel crossbar 35 from its vertical unlocked position as a safety measure so that the swivel crossbar 35 is not rotated to lock the pedal by accident.

In FIG. 3, the mounting shaft's 46 telescopic movement within elongate frame 10 may be locked and unlocked by a locking mechanism which is controlled by a combination of two locks, i.e. a first lock 25 and second lock 26. The combination of locking of the first lock 25 and second 26 may be configured such that only with the particular sequence of locking and unlocking of the two locks may lock and unlock the locking mechanism of the pedal lock. Thus, the two locks 25, 26 may, in combination, regulate the rotation of the swivel bar 30 to horizontal and vertical positions. For example, one or both locks 25, 26 may be configured to retain the swivel bar 30 in vertical, i.e. unlock, position to prevent accidental pivotal rotation of the swivel bar 30 into horizontal, i.e. locking, position.

Subsequent preferred embodiments of our pedal lock described in the following, i.e. FIGS. 4 to 14, are of the permanently affixed or installed type. The essential components of the installed embodiment of our pedal lock include the same essential ones as the removable type. That is, it includes an elongate frame 100, a first locking mechanism (not shown) installed within the elongate frame, a swivel bar 130 pivotable between a locked and unlocked positions, and a mounting member 140 which extends from the elongate frame to anchor onto a fixed part of the vehicle body, such as the steering column or vehicle floor board.

FIG. 4 shows a preferred embodiment of our pedal lock installed at a position in between two pedals such that, when the swivel crossbar is in horizontal, locked position, the swivel arms renders the respective pedals inoperable either by keeping the pedal depressed 131 or preventing the pedal from being depressed 133. Additionally, each of the swivel arm 131, 133 may be oriented or curved slightly upwardly or downwardly to engage the respective pedal in depressed mode. The left swivel arm 131 is shown as curved downwardly in depressing pedal 181 (for example, a foot parking brake pedal) while the right swivel arm 133 is shown curved upwardly in engaging the stem 183a of foot pedal 183 to prevent it from being depressed.

To allow for ease of installation and operation, a certain degree of tolerances may be allowed for ease of locking without close engagement or abutment between the contacting surfaces while, on the other had, ensuring that the pedals' free play are not exploitable by tampering with our pedal lock. To this end, studs or caps of suitable thickness may be added and secured onto the appropriate position on the swivel arm 131, 133 by screw means at positions such that the screw or bolt head would be obstructed when the swivel arms are rotated into locking position.

The mounting member 140 may similarly be provided as a rigid extension from the elongate frame 100 to a fixed part of the vehicle such as the steering column or floorboard. The embodiments illustrated by FIGS. 4 to 6 show the pedal lock configured to be mounted onto the floorboard. The distal end of the mounting member 140 is preferably adapted into a broad base 144 wherein means for bolting 145 the pedal lock permanently to the floorboard may be provided.

FIGS. 5 and 6 illustrate an alternative embodiment of our pedal lock for locking pedals on both sides of the pedal lock wherein the swivel crossbar is shown in locked (horizontal) and unlocked (vertical) positions respectively. It is configured to lock foot pedals at its left 181 and right 183 when the swivel crossbar 130, comprising left swivel arm 131 and right swivel arm 133, is rotated to about a horizontal position which blocks the respective right and left pedal stems 181a, 183a and renders both pedals 181, 183 inoperable. It is also possible that the embodiment of FIG. 5 is due to the difference in engaging left foot pedal 181 compared to that of FIG. 4. In FIG. 4 the left foot pedal 181 is first depressed before the pedal lock is operated to lock it with the left swivel arm 131 rotated to retain the pedal 181 in depressed position. In FIG. 5, the same pedal lock may be operated to lock with the swivel arm 131 rotated to block the pedal stem 181a and prevent the foot pedal from being depressed. FIG. 6 shows the swivel crossbar 130 in about a vertical position (shown in broken lines). Another feature of the embodiment of FIG. 5 and FIG. 6 is a bolt cover attachment 150, which is explained in FIG. 7 below.

FIG. 7 shows a top perspective view of a preferred embodiment of our pedal lock according to the invention in which the mounting member 140 is shown as a separate sub-drawing with a bolt cover attachment 150 detached. In addition to customizing the length of the mounting member 140 to suit the particular vehicle model's distance between the pedals and the floorboard, it is also possible to include studs or rings 148 behind the base 144. The base 144 in this embodiment is shown adapted into a tripod-like shape. As the pedal lock is anchored onto the vehicle floor board at behind the foot pedal area, the installation typically involves bolting it from the cabin side rather than from the engine compartment.

As such, to deal with tampering concerns that the exposed bolts may be unbolted upon accessing the cabin, a bolt cover attachment 150 is provided with a cover portion 153 which covers up two of the three bolts 145a so that the covered bolt heads are inaccessible to be unscrewed off or tampered with. The bolt cover attachment 150 itself is securely bolted onto the mounting member 140 by a screw 154 through the mounting member 140 at hole 146. To prevent access to this screw 154, a fin 137 may be provided on the swivel crossbar 130 such that when the crossbar 130 is in vertical, i.e. locked, position, the fin 137 substantially blocks or covers the head of screw 154 as shown in FIG. 7.

The mounting member 140 is rigidly fixed (e.g. by welding) to the top portion of the elongate frame 110 which top portion, in this drawing, is shown sawn-off to show an inner cylindrical shaft 202 which transmit the locking mechanism's 200 rotation between locked and unlocked positions to the swivel crossbar 130 to the respective horizontal and vertical positions. The rotation of the inner cylindrical shaft 202 may be limited to quarter turn (or about 90°) by having a pin 206 transfixing the elongate frame 110 and the inner cylindrical shaft 202 with guiding grooves 204, 204a provided respectively on the elongate frame 110 and inner shaft 202. The length of the guiding grooves 204, 204a may be limited corresponds to 90° or quarter turn.

For ease of user's locking of the pedal lock without having to provide for means for coaxial transmission of rotational movement to actuate the swivel crossbar 130, which does not interfere with the lock 126 or the locking mechanism 200, a linear mechanism may be introduced such as a slide mechanism 220. The slide mechanism 220 may be provided adjacent the locking mechanism 200, i.e. along the elongate frame 110 and comprises of a slide member 222 which may be advanced by pushing it to slide distally (or downwardly in an installed position in a vehicle). The sliding movement may be translated into a quarter turn movement by part of the slide member 222 provided with an inclined surface 224 acting as cam surface against protuberance 226 forming part of a ring member fixed onto the rotatable inner cylindrical shaft 202. A compression spring 228 may be provided at the end of the slide mechanism 220 to return slide member 222 to its initial position.

This translation of sliding down movement to rotational actuation of the locking mechanism may be varied by different mechanical translation such as pulling up a handle (i.e. the reverse of the sliding down movement) or by a suitable lever means. The amount of rotation required is about 45° and this could be easily achieved with a suitable lever mechanism.

FIG. 8 shows a disassembled view of the device of FIG. 7 wherein the major components of the device is shown undone in isolation and in coaxially orientation to illustrate certain components. Each of the components and its operation in relation to other components are further described in the following. The details of the anti-lock, locking and unlocking operations are described below with reference to FIGS. 9 to 14 below.

FIG. 9 shows the safety anti-lock mechanism of our pedal lock in its latched and unlocked position whereby the locking mechanism actuating the rotation of the swivel crossbar (not shown, at distal end) is prevented from rotating to locking (horizontal) position and remain secured in unlocked (vertical) position. This is achieved by having a first safety pin 230 protruding from first lock 125 through first safety hole 231 provided on the elongate frame 110 and engaging inner cylindrical 202 at second safety hole 232, thus preventing inner cylindrical shaft 202 from rotating. FIG. 10 illustrates the safety anti-lock mechanism being unlatched with the pushing of button 125a on first lock 125. This pushing of button 125a moves the first safety pin 230 forward. The first safety pin 230 has a forward facing surface that is tapered so that a forward push may engage it with the edge of safety holes 231 and/or 232, thereby translate the movement upwardly thereby retracting the first safety pin 230 into first lock 125 and thus unlatches the safety anti-lock mechanism.

As shown in FIG. 10, continuous pushing of button 125a will move the retracted first safety pin 230 forward towards locking groove 236 until the tapered surface of the pin drops thereinto. The groove 236 in combination with locking pin hole 235 provides a freedom of 90° or quarter turn of the inner cylindrical shaft 202. FIG. 10 also shows a second locking pin 240 which may be retained in the inner cylindrical shaft 202 by a pin sleeve 242, yet urged or biased outwardly towards the inner surface of elongate frame 110 (which part is shown cut-away) by spring means 243. At this juncture, the swivel crossbar 130 (not shown) is free to rotate to lock but is not and is merely unlatched to be free from the safety anti-locking feature aforedescribed which has prevented the locking mechanism from rotating to locking position.

FIG. 11 illustrates the operation subsequent to FIG. 10's free-to-rotate situation. As previously explained, the forward pushing of a slide member 222 enables the sliding mechanism 220 to translate the linear movement via inclined surface 224 to provide cam action against a protuberance 226 which turns the inner cylindrical shaft 202 and thus rotates the swivel crossbar 130 into horizontal locking position. The rotation of the inner cylindrical shaft 202 enables the tapered portion of the first safety pin 230 to be guided along groove 236 until it ends with a first locking hole 235 which diameter is large enough to allow the first safety pin 230 to drop through up and retained therein. The same rotation towards locking position will also bring about the second locking pin 240 to drop into second locking hole 244 provided through the elongate frame 110 into the first lock 125 simultaneous with the retention of first safety pin 230 in first locking hole 236. Thus, with a single linear movement from pushing the slide member, both the first lock 125 and second lock 126 may simultaneously and mutually locked each other. FIG. 12 shows the slide member 222 being released with its compression spring 228 returning it to its original biased position after having locked both the first and second locks 125, 126.

FIG. 13 and FIG. 14 show the sequence of the components' operations for unlocking. The unlocking sequence begins with FIG. 13 the first locking mechanism 125 being unlocked and second locking mechanism 126 remains locked. The subsequent unlocking sequence is shown in FIG. 14 with the second locking mechanism 126 being unlocked thereby releasing the pedal lock's swivel bar from its horizontal pedal locking position to a vertical unlocked position. Although each of the locks 125 and 126 may be provided with different keys for added security, for convenience of the user, the locks may be unlocked with the same key. As shown in FIG. 13, the first lock 125 is first unlocked with the key being used to turn the lock cylinder whereupon the first locking pin 230 is retracted to withdraw from first locking hole 235. The pedal lock, at this juncture, is still locked by the second lock 126 and thus the swivel crossbar 130 remains unmoved at horizontal locked position.

Next, the second lock 126 is unlocked with the turning of the lock cylinder whereupon the second locking pin 240 is retracted to withdraw from the second locking hole 244 and thus complete the disengagement between the two locks with inner cylindrical shaft 202 which is now free to rotate. As the shaft 202 is biased by spiral torsion spring 203, upon being released from locking, it will rotate to bring the swivel crossbar 130 to its vertical unlocked position. It should be noted that both locks 125 and 126 may be unlocked in any sequence and not necessary as described above, i.e. with unlocking the first lock 125 first and then second lock 126. The second lock 126 may be unlocked first before the first lock 125 is unlocked. Depending on the type and model of cylindrical locks used, while the key's turning to unlock may retain the locking pin in its cylinder, for ease of locking by spring-biased latching, such pin retention feature may not work. To this end, biasing means external to the locks such as a compression spring 127 at the distal end of the first lock 125 and spiral torsion lock 203 at the end of the inner cylindrical shaft 202 may provide biasing in different direction. As the external spring-biasing are in different directions, in this case at tangential, the retraction of the respective locking pins 230, 240 may cause a small displacements in different direction as well due to pin-to-hole tolerance which prevent the pin from being pushed back into its hole while awaiting the other pin to be retracted to complete the unlocking.

Although the foregoing detailed description has been made in respect of a specific, best mode embodiment, many of the features and embodiments, it would be understood by a person skilled in the art that the above locking, biasing and mechanical translating operations may be varied, modified or substituted by various configurations, components or parts to achieve the same results or effect in our pedal lock. These variations, adaptations, modifications or improvisations may not have been specifically mentioned or proposed herein but which may be obvious to a person having ordinary skill in the art to achieve. Moreover, there may be many other alternative or additional features which may be used in conjunction with the afore-described double leveraging mechanism to enhance or improve its functionality, which have not been described herein but which are to be understood as encompassed within the scope and letter of the claims hereinafter.

The invention claimed is:

1. A pedal lock for securing at least a foot pedal of a vehicle in an inoperable position, said pedal lock comprising an elongate frame comprising:
   a first locking mechanism configured to operate a swivel bar pivoted at a distal end of said elongate frame, said swivel bar pivotable between a first position and a second position;
   a mounting member extending from said elongate frame anchoring onto a fixed part of the vehicle body configured to immovably affix said pedal lock relative to said vehicle; and
   an actuator that comprises a button, configured to actuate the first locking mechanism upon pressing of the button, to operate the swivel bar to the first position;
   wherein
   in said first position, said pedal lock is in a locked position whereby said swivel bar is configured to block movement of said foot pedal, rendering it inoperable;
   in said second position, said pedal lock is in an unlocked position whereby said swivel bar is configured to unblock and allow movement of said foot pedal; and
   the actuator is configured to actuate the locking mechanism to rotate the swivel bar to the first position by hand actuation, thereby locking said pedal lock.

2. A pedal lock for securing at least a foot pedal of a vehicle according to claim 1, wherein:
   in the first position, the swivel bar is configured to pivot to a horizontal position across at least part of the foot pedal or foot pedal arm, thereby immobilizing said foot pedal;
   in the second position, the swivel bar is configured to pivot to a vertical position, clear from obstructing the pedal and pedal arm movement when said foot pedal is depressed and/or released.

3. A pedal lock for securing at least a foot pedal of a vehicle according to claim 1, wherein a lock-and-key is provided to enable said locking mechanism to rotate the swivel bar to the second position thereby unlocking said pedal lock.

4. A pedal lock for securing at least a foot pedal of a vehicle according to claim 1, wherein the button is provided at a proximal end of the elongate frame and is pushable telescopically thereinto to operate the swivel bar to the first position.

5. A pedal lock for securing at least a foot pedal of a vehicle according to claim 2, wherein, in the unlocked position, the swivel bar is configured to remain in a vertical position as the locking mechanism is latched and optionally biased to remain in the vertical position.

6. A pedal lock for securing at least a foot pedal of a vehicle according to claim 5, wherein the actuator and the locking mechanism are configured so that rotation of the swivel bar to the locking position includes releasing said swivel bar from being latched in said vertical position.

7. A pedal lock for securing at least a foot pedal of a vehicle according to claim 2, wherein the swivel bar is a lever rotatable about a central fulcrum at the distal end of the elongate frame.

8. A pedal lock for securing at least a foot pedal of a vehicle according to claim 7, wherein one end of the swivel bar is sufficiently long to block movement of the foot pedal and the other end providing at least in part weight counterbalance.

9. A pedal lock for securing at least a foot pedal of a vehicle according to claim 7, wherein both ends of the swivel bar is sufficiently long to block movement of respective foot pedals on either side of the fulcrum.

10. A pedal lock for securing at least a foot pedal of a vehicle according to claim 7, wherein in the locked position, a tip portion of the swivel bar in horizontal position is adapted to block the opposing edge of either one of the brake or clutch pedal.

11. A pedal lock for securing at least a foot pedal of a vehicle according to claim 1, wherein the elongate frame is substantially a tubular housing within which the locking mechanism is securely installed.

12. A pedal lock for securing at least a foot pedal of a vehicle in an inoperable position, said pedal lock comprising an elongate frame comprising:
a first locking mechanism configured to operate a swivel bar pivoted at a distal end of said elongate frame, said swivel bar pivotable between a first position and a second position;
a mounting member extending from said elongate frame anchoring onto a fixed part of the vehicle body configured to immovably affix said pedal lock relative to said vehicle; and
an actuator;
wherein
in said first position, said pedal lock is in a locked position whereby said swivel bar is configured to block movement of said foot pedal, rendering it inoperable;
in said second position, said pedal lock is in an unlocked position whereby said swivel bar is configured to unblock and allow movement of said foot pedal;
the actuator is configured to actuate the locking mechanism to rotate the swivel bar to the first position by hand actuation, thereby locking said pedal lock,
wherein the elongate frame is substantially a tubular housing within which the locking mechanism is securely installed, and
wherein the actuator is provided as a slide block adjacent the tubular housing, the sliding action of said block is translated to rotate the swivel bar to locked position.

13. A pedal lock for securing at least a foot pedal of a vehicle in an inoperable position, said pedal lock comprising an elongate frame comprising:
a first locking mechanism configured to operate a swivel bar pivoted at a distal end of said elongate frame, said swivel bar pivotable between a first position and a second position;
a mounting member extending from said elongate frame anchoring onto a fixed part of the vehicle body configured to immovably affix said pedal lock relative to said vehicle; and
an actuator;
wherein
in said first position, said pedal lock is in a locked position whereby said swivel bar is configured to block movement of said foot pedal, rendering it inoperable;
in said second position, said pedal lock is in an unlocked position whereby said swivel bar is configured to unblock and allow movement of said foot pedal;
the actuator is configured to actuate the locking mechanism to rotate the swivel bar to the first position by hand actuation, thereby locking said pedal lock, and
wherein a second locking mechanism is provided to secure the first locking mechanism in either locked or unlocked position.

14. A pedal lock for securing at least a foot pedal of a vehicle according to claim 13, wherein the second locking mechanism is provided to secure the first locking mechanism at the first position.

15. A pedal lock for securing at least a foot pedal of a vehicle according to claim 14, wherein the second locking mechanism is provided with an actuator to enable said second locking mechanism to be locked by manual actuation, whereas a lock-and-key is provided to enable said second locking mechanism to unlock and to enable first locking mechanism to be subsequently unlocked.

16. A pedal lock for securing at least a foot pedal of a vehicle according to claim 1, wherein a first lock is configured to be latched to remain in an unlocked position until manually unlatched by a user.

17. A pedal lock for securing at least a foot pedal of a vehicle according to claim 16, wherein the first lock is configured so that latching of the first lock in the unlocked position also secures a second lock from operating in the locked position.

18. A pedal lock for securing at least a foot pedal of a vehicle according to claim 17, wherein, with the first lock unlatched, the second lock is configured to be rotatable to a locking position in which a locking pin from each of said first lock and second lock engages against the other lock simultaneously in locking position.

19. A pedal lock for securing at least a foot pedal of a vehicle according to claim 18, configured so that rotation to locking position of at least one of the first lock and second lock is transmitted from a linear movement of a sliding mechanism.

20. A pedal lock for securing at least a foot pedal of a vehicle according to claim 18 configured so that rotation to locking position of at least one of the first lock and second lock is transmitted from a lever movement of a lever mechanism.

21. A pedal lock for securing at least a foot pedal of a vehicle according to claim 15, wherein the first and second locking mechanisms are configured to be locked and/or unlocked by the same key.

22. A pedal lock for securing at least a foot pedal of a vehicle according to claim 13, wherein the swivel bar is configured to remain biased to remain in vertical position when either one of the first or second locking mechanisms is still locked.

23. A pedal lock for securing at least a foot pedal of a vehicle according to claim 13, wherein when the swivel bar is in the unlocked, vertical position, the first locking mechanism is configured so that it may not be actuated to rotate said swivel bar to locked, horizontal position until the second locking mechanism is first actuated to its locking position.

24. A pedal lock for securing at least a foot pedal of a vehicle in an inoperable position, said pedal lock comprising an elongate frame comprising:
- a first locking mechanism configured to operate a swivel bar pivoted at a distal end of said elongate frame, said swivel bar pivotable between a first position and a second position;
- a mounting member extending from said elongate frame anchoring onto a fixed part of the vehicle body configured to immovably affix said pedal lock relative to said vehicle; and
- an actuator;

wherein
- in said first position, said pedal lock is in a locked position whereby said swivel bar is configured to block movement of said foot pedal, rendering it inoperable;
- in said second position, said pedal lock is in an unlocked position whereby said swivel bar is configured to unblock and allow movement of said foot pedal;
- the actuator is configured to actuate the locking mechanism to rotate the swivel bar to the first position by hand actuation, thereby locking said pedal lock, and
- the mounting member comprises a reversibly extendable arm, wherein the distal end is provided with a base plate such that, upon the swivel bar is rotated to the first position, said extendable arm is extended to enable the base plate to engage the vehicle floor to render said pedal lock immovable, and wherein the first locking mechanism is also configured to secure said arm at the extended length.

25. A pedal lock for securing at least a foot pedal of a vehicle according to claim 13, wherein the mounting member comprises a reversibly extendable arm, wherein the distal end is provided with a base plate such that, upon the swivel bar is rotated to the first position, said extendable arm is extended to enable the base plate to engage the vehicle floor to render said pedal lock immovable, and wherein at least one of the first and second locking mechanism is also configured to secure said arm at the extended length.

26. A pedal lock for securing at least a foot pedal of a vehicle according to claim 1, wherein the mounting member extends from the elongate frame to end with a base affixable to the vehicle floor.

27. A pedal lock for securing at least a foot pedal of a vehicle according to claim 26, wherein the base is a tripod base with a bolt-and-nut to secure said pedal lock to the vehicle floor.

28. A pedal lock for securing at least a foot pedal of a vehicle according to claim 1, wherein the mounting member extends from the elongate frame to a clamp adapted to secure the pedal lock to the steering column.

* * * * *